No. 617,101. Patented Jan. 3, 1899.
E. KELLY.
GUARD OR FENDER FOR VEHICLE WHEELS.
(Application filed Mar. 9, 1898.)
(No Model.)
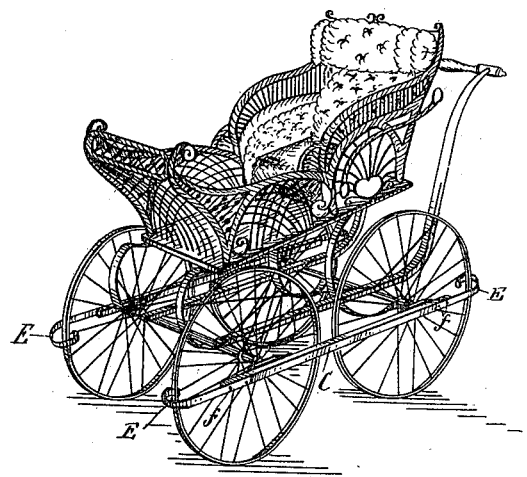
Fig.1.
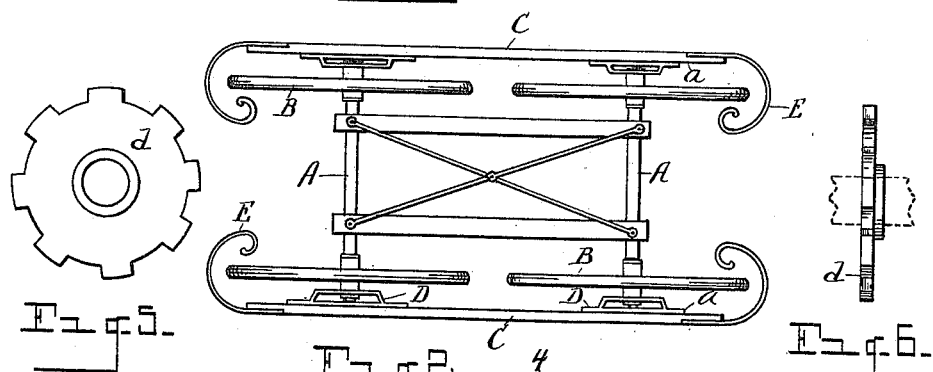
Fig.5.   Fig.2.   Fig.6.
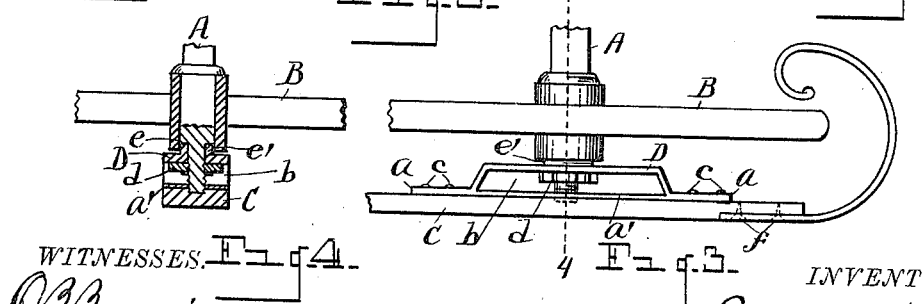
WITNESSES  Fig.4.   Fig.3.   INVENTOR.
Edward Kelly
By R. B. Wheeler & Co.
Attorneys
THE NORRIS PETERS CO., PHOTO-LITHO., WASHINGTON, D. C.

UNITED STATES PATENT OFFICE.

EDWARD KELLY, OF WALLACEBURG, CANADA.

GUARD OR FENDER FOR VEHICLE-WHEELS.

SPECIFICATION forming part of Letters Patent No. 617,101, dated January 3, 1899.

Application filed March 9, 1898. Serial No. 673,281. (No model.)

*To all whom it may concern:*

Be it known that I, EDWARD KELLY, a citizen of Canada, residing at Wallaceburg, in the county of Kent, Province of Ontario, Canada, have invented certain new and useful Improvements in Guards or Fenders for Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to flexible fenders for vehicle-wheels, especially designed for use on baby-carriages; and it consists in the construction and arrangement of parts hereinafter more fully set forth, and pointed out particularly in the claims.

The object of the invention is to provide a flexible guard or fender which will embrace the wheels of the vehicle, so as to guard and protect them, and extend along the sides of the vehicle, so as to prevent the ends of the axles or the projecting nuts thereon from coming in contact with or injuring woodwork of dwellings or articles of furniture. This object is attained by the arrangement of parts illustrated in the accompanying drawings, in which—

Figure 1 is a perspective view of a baby-carriage embodying my invention. Fig. 2 is plan view of the running-gear of a baby-carriage, showing my improved fender applied thereto. Fig. 3 is a plan view in detail, showing the manner of mounting the fender upon the axles of the vehicle. Fig. 4 is a transverse section on line 4 4 of Fig. 3. Fig. 5 is a plan view of the locking-nut. Fig. 6 is an edge view thereof.

Referring to the letters of reference, A designates the axles of an ordinary baby-carriage, upon which are journaled the usual transporting-wheels B.

C designates the side bars of the fenders, which are made preferably of wood and are of suitable width and thickness. Secured to the inner faces of said side bars are the angular brackets D, preferably of malleable casting, having the feet portions $a$ at their ends, through which they are secured by means of screws $c$ to said side bars, as shown, and provided with the straight side portion $a'$, connecting said feet. The formation of the angular portion of said brackets is such that said portion extends inward from the face of said straight portion, forming an open space $b$ between the inner face of the angle portion and the parallel straight portion of said brackets. The ends of the axles A are adapted to pass through apertures in the parallel sides of said brackets and enter a recess in said side bars. Said axles receive the nuts $d$ thereon, which lie in the space $b$ between the opposed sides of said brackets, whereby said bars of the fender are securely retained in place and the nuts $d$ upon the ends of the axles guarded and protected by said bars, said brackets being securely locked between the nuts $d$ and the shoulders $e$ upon the axles, against which a raised boss $e'$ on the inner side of said brackets bears and which lies within the cavity in the end of the hub, whereby the wheels are retained in place and the brackets secured to the ends of the axles by the use of but one nut for each axle end, as shown in Fig. 4.

E designates a series of spring-terminals forming the complementary portion of the fenders, which are attached to the opposite ends of the side bars C by means of screws $f$, as shown, and which curve forwardly and inwardly in the form of a scroll, so as to embrace and form a guard for the wheels B. These terminals E are made, preferably, of spring metal and are adapted to yield when coming in contact with any obstacle and serve to deflect the carriage therefrom and prevent contact of the wheels therewith, while the side bars C, extending along the sides of the vehicle, prevent contact of the nuts on the ends of the axle with any object from which the wheels have been deflected by means of the spring-terminals of the fenders. The spring-fenders may be made continuous, so as to extend the entire length of the side bars, if desired.

While this improved guard and fender serves to prevent the wheels and ends of the axles from coming in contact with any obstacle, it also serves to protect the dress of the attendant from becoming soiled through contact with the wheels, which are often dirty, or from engagement with the ends of the axles, which are often greasy because of the lubricant used thereon.

It will be observed that the nut $d$ employed to secure the bracket to the axle is circular and provided with projecting teeth on the periphery thereof. This form of nut may be made very thin, so as to readily lie within the space $b$ of the bracket, while the projections on the edge thereof enable the use of a small spanner for turning said nut.

Having thus fully set forth my invention, what I claim as new, and desire to secure by Letters Patent, is—

1. A guard and fender for baby-carriages comprising horizontal side bars mounted on the ends of the axle and provided with scroll-shaped spring-terminals forming fenders adapted to embrace the wheels of the vehicle.

2. In a guard or fender for vehicle-wheels, the combination of the side bars having the spring-terminals which embrace and guard the wheels, the angular brackets mounted upon the inner face of said side bars through which the end of the axle extends, and the nut screwing onto the end of the axle against said bracket and lying between said bracket and the inner face of said side bar.

3. In a guard and fender for vehicle-wheels, the combination of the wheels and axles, the horizontal side bars mounted on the opposite ends of the axles, said side bars being provided with end portions comprising flexible fenders adapted to embrace the wheels and attached to the ends of said side bars.

4. The combination of the side bars having spring-terminals which embrace and guard the wheels, the angular brackets mounted on the inner faces of the side bars having the opposed parallel side portions forming an open space between them, the axles passing through said parallel portions of said brackets and entering the side bars, the projections on said brackets entering the ends of the hubs of the wheels and engaging a shoulder on the axles, and the nuts screwing onto the axle and lying in the spaces in said brackets.

In testimony whereof I sign this specification in the presence of two witnesses.

EDWARD KELLY.

Witnesses:
J. A. STEINHOFF,
E. ESTELL PARKER.